United States Patent
Grimmer et al.

(10) Patent No.: US 7,550,103 B2
(45) Date of Patent: *Jun. 23, 2009

(54) PLASTIC SKIN FORMING PROCESS

(75) Inventors: Robert A. Grimmer, Berwick, ME (US); Dave Syphers, Berwick, ME (US); Denis Moore, Rollinsford, NH (US)

(73) Assignee: International Automotive Components Group North America, Inc., Dearborn, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/641,997

(22) Filed: Aug. 15, 2003

(65) Prior Publication Data

US 2004/0113322 A1 Jun. 17, 2004

Related U.S. Application Data

(63) Continuation-in-part of application No. 10/433,361, filed as application No. PCT/US02/32413 on Oct. 9, 2002, now Pat. No. 7,425,294.

(60) Provisional application No. 60/327,979, filed on Oct. 9, 2001.

(51) Int. Cl.
 B29C 35/02 (2006.01)
 B29C 35/16 (2006.01)
 B29C 67/06 (2006.01)
 B29C 39/04 (2006.01)
 B29C 33/34 (2006.01)

(52) U.S. Cl. ............... 264/302; 264/402; 425/174.4

(58) Field of Classification Search ................ 264/410, 264/402, 462, 481, 492, 302; 425/174.4
See application file for complete search history.

(56) References Cited

U.S. PATENT DOCUMENTS

| | | | | |
|---|---|---|---|---|
| 3,315,016 | A | | 4/1967 | Wersosky et al. ............. 264/25 |
| 3,346,723 | A | * | 10/1967 | Mohn et al. ................. 219/553 |
| 3,419,455 | A | * | 12/1968 | Roberts ..................... 428/36.5 |
| 3,449,546 | A | * | 6/1969 | Dhoble ........................ 219/216 |
| 3,488,411 | A | * | 1/1970 | Goldman .................... 264/402 |
| 3,507,950 | A | * | 4/1970 | Barnett et al. ............... 264/310 |
| 3,564,656 | A | | 2/1971 | Barnett et al. |

(Continued)

FOREIGN PATENT DOCUMENTS

EP 0334 074 A2 3/1989

(Continued)

OTHER PUBLICATIONS

Harris, Daniel C., Materials for Infrared Windows and Domes, 1999, SPIE Optical Engineering Press, pp. 1-6.*

(Continued)

*Primary Examiner*—Matthew J. Daniels
(74) *Attorney, Agent, or Firm*—Grossman, Tucker, Perreault & Pflege, PLLC

(57) ABSTRACT

An apparatus and method of producing plastic articles comprising preheating a metal mold having a mold contour using infrared heating elements formed to match said mold contour to establish a casting temperature, casting plastic material onto the preheated metal mold surface, fusing the plastic using infrared energy, cooling the metal mold using the change of phase or state of a cooling material and removing the cast plastic article from said metal mold.

27 Claims, 3 Drawing Sheets

U.S. PATENT DOCUMENTS

| | | | |
|---|---|---|---|
| 3,677,670 A | 7/1972 | Mori et al. | 425/62 |
| 3,728,429 A | 4/1973 | Colby et al. | 264/302 |
| RE28,497 E * | 7/1975 | Gasmire | 264/28 |
| 3,971,674 A * | 7/1976 | Brandt et al. | 148/275 |
| 4,217,325 A | 8/1980 | Colby | 264/245 |
| 4,298,324 A | 11/1981 | Soulier | 425/174.8 |
| 4,389,177 A | 6/1983 | Colby | 425/144 |
| 4,583,932 A | 4/1986 | Meuret | 425/182 |
| 4,623,503 A | 11/1986 | Anestis et al. | 264/302 |
| 4,740,337 A | 4/1988 | Gale et al. | 264/40.6 |
| 4,755,333 A | 7/1988 | Gray | 264/37 |
| 4,759,333 A | 7/1988 | Shimomura et al. | 123/494 |
| 4,898,697 A | 2/1990 | Horton | 264/37 |
| 4,929,293 A | 5/1990 | Osgar | 156/158 |
| 4,946,638 A | 8/1990 | Takamatsu | 264/302 |
| 4,946,663 A | 8/1990 | Audley et al. | 423/447.1 |
| 4,979,888 A * | 12/1990 | Bauer et al. | 425/174.4 |
| 5,002,476 A * | 3/1991 | Kerr | 425/174.4 |
| 5,032,076 A * | 7/1991 | Jackson, Jr. | 425/435 |
| 5,059,446 A | 10/1991 | Winkle, Sr. et al. | 427/32 |
| 5,106,285 A | 4/1992 | Preston | 425/144 |
| 5,308,700 A | 5/1994 | Hikasa et al. | 428/402 |
| 5,439,406 A * | 8/1995 | Fuwa et al. | 445/2 |
| 5,441,675 A | 8/1995 | Souders | 264/25 |
| 5,466,412 A | 11/1995 | Parker et al. | 264/255 |
| 5,580,501 A | 12/1996 | Gallagher et al. | 264/45.3 |
| 5,840,229 A | 11/1998 | Sugimoto et al. | 264/142 |
| 5,993,721 A | 11/1999 | Kurihara et al. | 264/402 |
| 6,013,210 A | 1/2000 | Gardner, Jr. | 264/40.1 |
| 6,019,390 A | 2/2000 | Keshavaraj | 280/743.1 |
| 6,019,590 A | 2/2000 | McNally | 425/270 |
| 6,071,456 A * | 6/2000 | Hanamoto et al. | 264/265 |
| 6,082,989 A | 7/2000 | McNally | 425/435 |
| 6,241,929 B1 | 6/2001 | Akopyan | 264/219 |
| 6,299,817 B1 | 10/2001 | Parkinson | 264/402 |

FOREIGN PATENT DOCUMENTS

| | | | |
|---|---|---|---|
| EP | 0 366 407 A | | 5/1990 |
| EP | 0887378 | * | 12/1998 |
| EP | 0 918 065 A1 | | 5/1999 |
| JP | 63-183819 | | 7/1988 |
| JP | 1275108 A | | 11/1989 |
| JP | 6-190846 | | 7/1994 |
| JP | 10-103623 | | 4/1998 |
| WO | WO 03/031139 | | 4/2003 |

OTHER PUBLICATIONS

PCT International Search Report with written opinion dated Mar. 3, 2005 (13 pgs).
Supplementary European Search Report dated Jun. 6, 2006 issued in the corresponding European Patent Application No. 02769039.5 filed Jul. 23, 2003 (3 pgs).
Supplementary European Search Report dated Feb. 22, 2007 issued in the corresponding European Patent Application No. 02769039.5 filed Jul. 23, 2003 (5 pgs).
International Search Report dated Dec. 23, 2002 issued in the corresponding International Application No. PCT/US02/32413 (2 pgs).

* cited by examiner under pressure that the forming process becomes more efficient than prior processes. Little heat is wasted heating the facility or other apparatus which is common with gas-fired processes.

PLASTIC SKIN FORMING PROCESS

CROSS REFERENCE TO RELATED APPLICATIONS

This application is a continuation-in-part of U.S. application Ser. No. 10/433,361, filed Nov. 17, 2003 now U.S. Pat No. 7,425,294, which is a U.S. National Stage of PCT/US02/32413, filed Oct. 9, 2002 which designates the United States, and which claims priority to U.S. Provisional Application No. 60/327,979, filed Oct. 9, 2001.

FIELD OF INVENTION

The present invention relates to an improved method for forming relatively thin plastic skins or shells from a mold surface using infrared heating and evaporative cooling. More particularly, the method relates to the efficient manufacture of thin thermoplastic shells or skins used as the outer surface for automotive interior trim products such as instrument panels, door panels, headrests, console covers, air bag doors, glove box doors and the like.

BACKGROUND OF THE INVENTION

Over many decades, the processes for forming thin skins of thermoplastic on a mold surface have evolved, driven primarily by cost and weight objectives.

Early on, electroformed nickel and nickel/copper molds were filled with a predetermined charge of liquid plastisol and rotated through a gas-fired oven and into a water spray section to produce shells which were subsequently filled with urethane foam and used as vehicle arm rests and the like. Usually, the apparatus used for producing these shells was a series of multi-armed spindles that indexed between filling, heating, cooling and stripping stations. U.S. Pat. No. 4,898,697 to Horton which is directed at an apparatus of this type is commonly assigned to the assignee of the present invention and is included herein by reference.

As the demand for soft feel interior trim products for automobile interiors increased in the 1950's and 1960's, larger parts were developed, such as instrument panels. This lead to a "slush molding" process as opposed to rotational molding, where liquid plastisol was pumped into a preheated electroformed mold to coat (gel against) the mold surface. Any excess plastisol is dumped out before the mold indexed into the fuse and cooling stations. These large electroformed nickel tools could not be easily rotated in various axes due to their size nor did they need to be, as the products were becoming long and relatively flat. This led to an over-and-under conveyorized process which required a large number of electroformed molds (10-30) to be used in order to fill a continuously moving production line. Here, either gas-fired burners or induction heating coils that resembled the contour of the mold and of the final product were used to provide heat in stations for gelling and fusing the plastic. This conveyorized process also limited the number of shapes of molds that could be processed without facility modification to basically one, as the heating apparatus was shape-specific. U.S. Pat. No. 3,728,429 which is directed at an apparatus of this type is commonly assigned to the assignee of the present invention and included herein by reference.

Because of the space requirements of the conveyorized line and the cost of using many electroformed molds, a modular slush process evolved. Here a single electroformed mold was rotated around its major axis in a single station and heat and cooling supplied to it. Stainless steel tubing was welded to the backside of the electroformed mold and hot or cool heat transfer fluid was circulated through the tubes to heat and cool the mold and the liquid plastisol contained in the mold. Cleanliness was difficult to maintain in this process as thicker sections of the plastic skin, particularly drips and runs from the excess liquid plastisol being dumped out, would remain unfused and transfer to both the station operator and adjacent shells. U.S. Pat. No. 5,106,285 to Preston and U.S. Pat. Nos. 4,389,177 and 4,217,325 to Colby which are directed to apparatus of this type are commonly assigned to the assignee of the present invention and included herein by reference.

Powder slush formations for PVC as well as other thermoplastics (TPU, TPE, TPO, ASA, etc.) next evolved to minimize waste in the slush process and produce skins of more uniform thickness. Here, only a defined thickness of powder next to the heated mold surface melted and the unmelted powder was returned to a powder box for future use. This modular process resulted in the need for fewer molds and allowed for rapid mold changes.

A further difficulty with stainless steel tubes welded onto the electroform molds was one of shortened mold life. The heat stresses that the nickel mold was exposed to during welding of the tubes to the mold resulted in mold cracking. To solve this, alternate means of heating the mold were explored. Dipping the electroform into a fluidized bed (U.S. Pat. No. 4,946,663 to Takamatsu) or into a heat transfer medium was employed. Induction heating (U.S. Pat. No. 3,315,016 to Wersosky, et al commonly assigned and incorporated herein by reference), and microwave heating methods have been noted. A hybrid method utilizing a robot and multiple stations is disclosed in U.S. Pat. No. 4,755,333 to Gray (commonly assigned and incorporated herein by reference).

Most popular was a modular processing apparatus where a mold box was used to enclose the backside of the nickel electroform mold, and gas-fire-heated air was impinged through tubes at high velocity onto the backside of the electroformed mold to provide fast heating (or outside ambient air cooling) cycles. U.S. Pat. No. 4,623,503 to Anestis, et al which is directed at apparatus of this type is commonly assigned to the assignee of the present invention and included herein by reference. U.S. Pat. Nos. 6,019,390 and 6,082,989 to McNally and U.S. Pat. No. 6,013,210 to Gardner describe variations on this process. On relatively cool ambient days, cycles in the order of 4 minutes could be achieved. However, to move to the next level of cycle improvement, some of the disadvantages of this apparatus needed to be overcome. The hot air impinging in the back of the electroformed mold was at such a pressure that the nickel mold would flex and ultimately crack due to fatigue. The modular processing apparatus evolved to a large mold stand with a gas-fired burner overhead and many feet of duct work supplying hot and cool air. This apparatus had to be insulated and resulted in inefficient heating and cooling. Ambient noise and heat pollution also became issues for the station operators.

What is needed is a process that provides rapid cycle times, uses low cost energy and requires a relatively inexpensive facility. Further, the process should heat and cool only the mold and plastic skin material that it contains, and accommodate the use of thin lightweight molds. Even further, this should be an environmentally friendly process with little noise and wasted heat, using process apparatus that can be converted from one mold/product shape to another rapidly to reduce process downtime.

SUMMARY OF THE INVENTION

The present invention addresses the deficiencies of the prior art by providing an efficient skin-forming process utilizing lightweight metal molds heated via infrared (IR) energy and cooled preferably through evaporation via a water/air mist spray. Since the IR energy is directed preferably at the backside of the mold utilizing heater elements that are contoured to match the shape of the mold, little heat is wasted and any heating of ducting and other peripheral equipment as well as the surrounding ambient area is eliminated. Since the molds are not subjected to other stresses (air pressure, etc.) than their own weight, thinner and therefore, more uniform electroformed molds can be used, further decreasing cycle time and any propensity to stress crack. Alternatively, the grained surface of the mold containing the plastic shell material may also be heated. Evaporative cooling, using the latent heat of vaporization of water (or other fluids), provides a significant reduction in cooling time, which is further enhanced by the thinner more uniform electroform, by the elimination of any duct work needed for cooling and by the atomization of the water spray. Alternatively, any material which changes phase or state in the temperature range of the process described herein may be used to cool the mold.

A further embodiment includes the use of heat absorption/emissivity as a means to tune or balance the heat input into various areas of the electroformed mold. Use of black paint on the back side of the mold facing the IR heaters can help heat thicker mold sections faster or conversely lighter shades of paint (grey) can slow the heating of thin mold sections or reduce the plastic skin thickness formed in that area to nil, saving material and reducing the need to trim off excess waste. Improved heat balance is possible via this method of painting various shades of grey on the backside of the mold and can lead to more uniform shell gloss, reducing the need to post-paint. Improved heat distribution is also critical to ensure the casting of a skin of uniform thickness as many of the newer powdered thermoplastics such as TPU, TPE and TPO's, may have a very distinct melt point.

In another embodiment, using infrared heating, technology now exists to make thermoplastic materials more sensitive or conducive to heating by IR energy through the use of additives that improve the heat absorptivity of the thermoplastic materials, further reducing cycle time. This feature is employed when IR heating is directed at the open side of the shell toward the plastic as it is solidifying in the mold. A material such as carbon black may be added to the thermoplastic material to enhance its heat absorptivity.

The casting process may be organized in a number of ways, by using an over-and-under conveyor holding a number of molds, or in a modular fashion, but preferably by utilizing 3-4 stations and a robot to manipulate the mold from preheat (A) to casting (B), and back to heating for fusing (A), then to cooling (C) and stripping as shown in the appended drawings.

Accordingly, the present invention is directed at a method of producing plastic articles, comprising preheating a metal mold having a mold contour using infrared energy from infrared energy heating elements that are formed to match said mold contour to establish a casting temperature, casting plastic material onto said preheated metal mold, fusing said plastic using infrared energy, cooling said metal mold by contacting said metal mold with a material which can change phase or state and removing the cast plastic article from said metal mold.

In addition, the present invention is directed at a method of producing plastic articles, comprising a metal mold that is positioned at a first heating station, wherein a metal mold having a mold contour is preheated using infrared energy from infrared energy heating elements that are formed to match said mold contour to establish a casting temperature, positioning said mold at a second station and casting plastic material onto said preheated metal mold, positioning said mold at said first station and fusing said plastic using infrared energy, positioning said mold at a third station and cooling said metal mold by contacting said metal mold with a material which can change phase or state, positioning said mold at a fourth station and removing the cast plastic article from said metal mold.

In apparatus form, the present invention is directed at an apparatus for products cast as plastic articles comprising: (i) a metal mold to receive cast plastic material, said mold having a mold contour; (ii) infrared heaters to heat said mold to a desired casting temperature, said infrared heaters including infrared heating elements formed to match the contour of said mold; and (iii) a cooling device to deliver a material which can change phase or state.

BRIEF DESCRIPTION OF THE DRAWINGS

These and other objects, features and advantages of the invention will become apparent upon consideration of the description of the invention and the appended drawings in which.

DESCRIPTION OF THE PREFERRED EMBODIMENT

Figure 1:
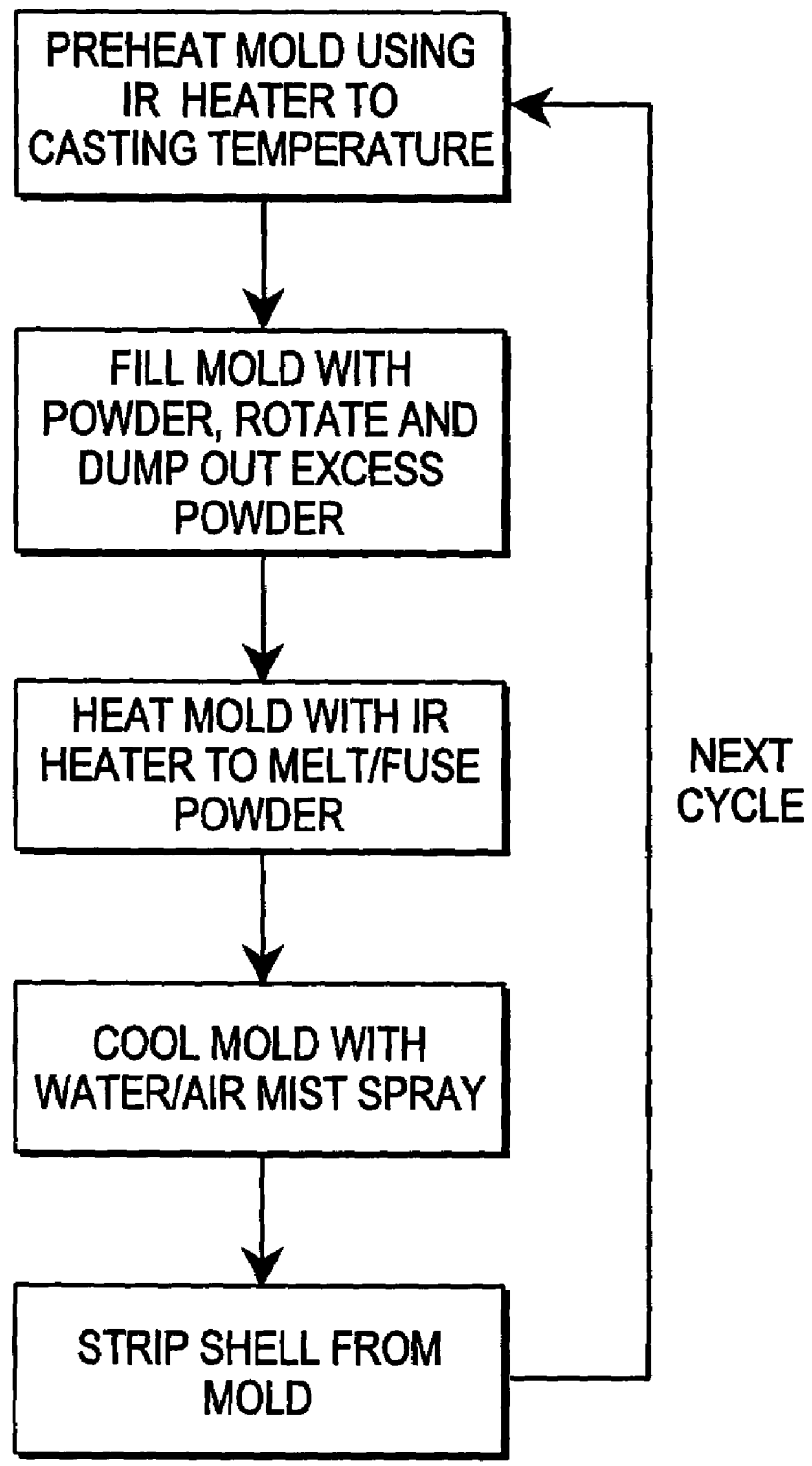
FIG. 1 is a flow chart describing the process steps of the present invention.

As noted above, FIG. 1 is a flow chart depicting the process steps used in the invention to produce plastic skins for automotive trim applications. A thin electroformed nickel mold is preheated using electric infrared heaters and when the mold reaches the preferred powder casting temperature for the specific plastic powder being processed, the mold is filled with powder, by using a powder box which clamps onto the mold face and which, when inverted, fills the mold cavity with powder. The mold is then rotated, generally around its major axis, to allow the powder to contact the exposed inner surface of the electroformed mold and melt on this heated surface. Next, the mold/powder box combination is inverted and any unmelted powder is allowed to fall back into the powder box which is then unclamped and retracted. The mold may then be subjected to additional IR heat to fuse the plastic layer on the mold surface. The mold is then sprayed with a fine mist of water and air to cool its surface to the desired stripping temperature. Once the stripping temperature is reached, the cooled solid skin is removed and the next cycle initiated. Liquid thermoplastic formulations such as plastisols or organisols can be processed in a like manner. Further, multiple plastic materials may be cast in layered or non-layered (that is, adjacent) disposition to provide unique properties or reduce cost (particularly for backing layers where regrind may be used).

Figure 2:
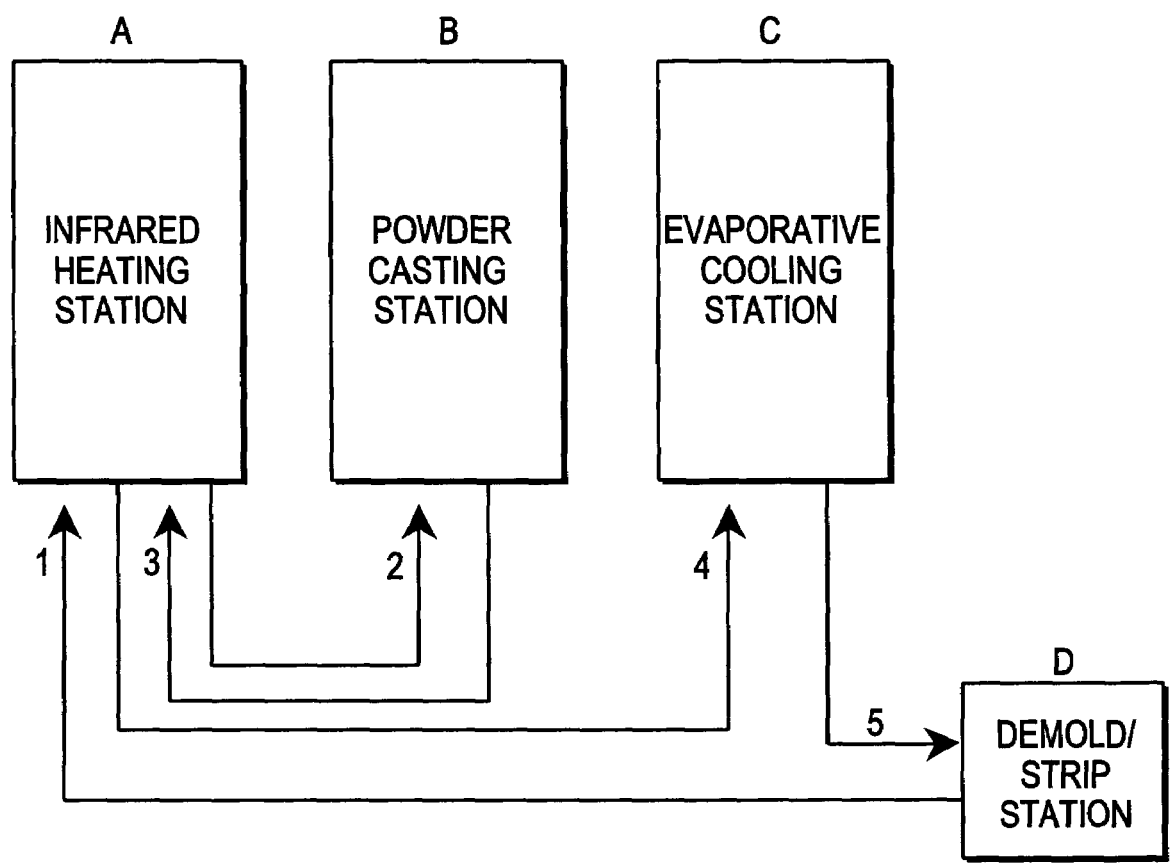
FIG. 2 is an exemplary schematic drawing of a process sequence in accordance with the present invention.

FIG. 2 depicts this process in greater detail. While shown here as basic apparatus stations, the apparatus may take the form of a moving or indexing line, a robot manipulator and multiple stations (as disclosed in 4,759,333 to Gray and incorporated herein by reference), or any other sequence that is consistent with FIGS. 1 and 2, including casting multiple layers of plastic, multiple types of plastic and foamed layers of thermoplastic to form skins or shells.

More particularly, a metal mold preferably of nickel and most preferably of electroformed nickel, is formed having the surface pattern (grain, texture, decoration) and contour desired for the final automotive skin or shell. Preferably, this electroformed mold is of a relatively uniform thickness between 0.050" and 0.400", more preferably between and including 0.100"-0.150", to minimize the weight of nickel to be heated and cooled and to minimize internal stresses on the mold. Thinner molds are possible depending on their shape and on their ability to support their own weight and that of the powder which must fill the mold to adequately coat the mold surface to make a complete and uniform skin. In addition, other compositions of metal molds may be used, including but not limited to, nickel-copper, beryllium-copper, stainless steel, etc. Electric IR heaters are preferred, such as those available from Convectronics in Haverhill, Mass., as the energy source in the casting process-as they are not noisy, do not emit gaseous pollution and are readily shapeable, allowing the heating elements to be contoured to closely match each specific mold outer contour. Targeting a time duration of about one minute to heat the combined mold mass and powder covering its surface to the casting temperature, about 47 watts/in$^2$ of energy are needed. While wavelengths of 0.7 to 1000 microns (the infrared portion of the electromagnetic spectrum) may be used, it has been found that the most desirable infrared wavelength is 2.1-3.0 microns in order to generate sufficient output temperature (1275-2000 degrees F.) yet provide a reasonable heater element life and minimize potential safety hazards. Using for instance, 277 volt/three phase power, a heater capable of generating 47 watts/in$^2$ output produced a consistent operating output temperature of 1450 degrees F. However, in the broad context of this invention, it may be preferred to utilize infrared heating elements capable of generating at least about 20 watts/in$^2$, more preferably at least 30 watts/in$^2$, even more preferably at least 40 watts/in$^2$, and in a most preferred embodiment, in the range of 45-55 watts/in$^2$. Tubular IR heater elements about ⅜ of an inch in diameter, made of an Inconel outer sleeve and an Inconel wire element packed with magnesium oxide inside the Inconel sleeve, provided the desired energy. The tubular heaters were provided with cold ends which simplified mounting, and fiber washers were used to seal each end of the sleeve to allow moisture to vent. The tubular heaters were bent in a pattern to closely conform to the backside of the electroformed mold and spaced from 0.01" to 5 inches off the back surface of the mold, but preferably 1-3 inches off the mold surface. The tubular heaters are further spaced about 1-3 inches apart running along the mold to uniformly cover the surface of the mold to be heated. The tube spacing may be in a lateral, longitudinal, diagonal, or any other pattern which provides a relatively uniform coverage of the backside of the mold. Shorter elements provide fewer issues with thermal expansion upon heating. A thermocouple may be installed on the front surface of the mold at a point of average mold thickness to sense the temperature and control the tubular heater elements. The thermocouple is preferably embedded in the mold by drilling a hole and potting the end of the wire using silver solder. To correct any problem with "cross-fire" (the problem of one heater element facing another and driving the opposite heater beyond its setpoint), each heater element was equipped with a thermocouple and independently controlled using a solid state relay coupled with a voltage regulator. Alternatively, adjacent heater elements may be connected in series and sensed with a single thermocouple. By connecting a thermocouple to each heater element, if one heater starts to override the adjacent heater element, the thermocouple alerts the solid state controller which is programmed to reduce the voltage to that heater, preventing burnout. Thus, a heater array is provided which yields a uniform and consistent temperature, is specific to each mold shape and is portable such that it can easily be exchanged when a new mold shape is used. Consequently, a most desirable heating source is provided having no moving parts and without the potential pollution issues of noise, heat and fumes.

To further balance the heat absorbed by the, preferably, electroformed mold in order to yield a more uniform skin or shell thickness, especially in complex and undercut shapes, the use of black body absorption/emissivity is employed. Black paint capable of withstanding the temperatures encountered in the process was applied to the backside of the mold to aid in heat transfer. Nickel has an emissivity of 0.11 while a glossy black paint surface has an emissivity of about 0.86 providing much greater IR heat absorption. Since the plastic skin or shell being formed should be as uniform as possible, usually around 0.025-0.040 inches in thickness, and in order to use as little powder as possible to cast each shell, heat balancing of the mold is necessary. This is usually carried out using thermography techniques first, to provide a uniform mold temperature by adjusting the shape of the heater elements as well as the distance from the back surface of the mold and the applied power level to each heater element. Next, shells are cast and sectioned and measured for thickness every inch or so in both x and y planes to yield a shell preferably-between 0.025-0.040 inches in thickness. It has been found that a fine tuning of the heat balance, and therefore shell thickness, can further be accomplished through the application of different shades of grayscale paint to the back of the mold surface. Particularly in areas of the mold which are thin (due to the complex geometry of the shape being electroformed) and in "waste" areas where little or no skin or shell is desired, such as might get trimmed out of openings in the final product or along peripheral edges, light colored shades of grey paint may be applied to reduce the heat absorbed (and therefore the thickness of shell formed due to the melting of less powder). Further, more uniform mold temperatures result in more uniform gloss and color readings of the surface of the final cast skin or shell eliminating or reducing the need to post-paint the article formed.

Figure 3:
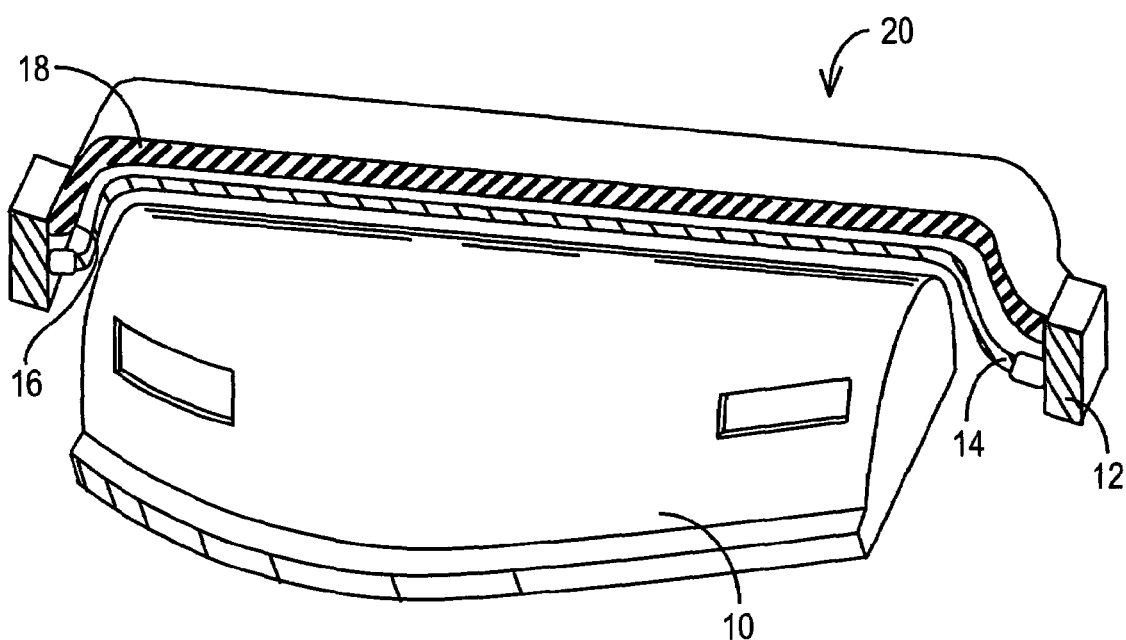
FIG. 3 is a sectional view of the contoured heating apparatus of the present invention.

FIG. 3 is a sectional view of the heating apparatus of the present invention. An electroformed nickel mold 10 is placed under an IR heating apparatus 20. IR heating elements 14 preferably run in a parallel array along the length (alternatively, the width) of the mold and are contoured to follow the mold's surface spaced off by up to a few inches to provide uniform heat. The preferred heating apparatus further comprises an outer fame 12 for support, a reflection shield 16 for containing the energy and directing it towards the mold surface and a layer of K-wool insulation 18. This provides a lightweight heating apparatus which is easy to change out when a different mold shape is desired to be used and a corresponding different shaped array of heaters is required.

Figure 4:
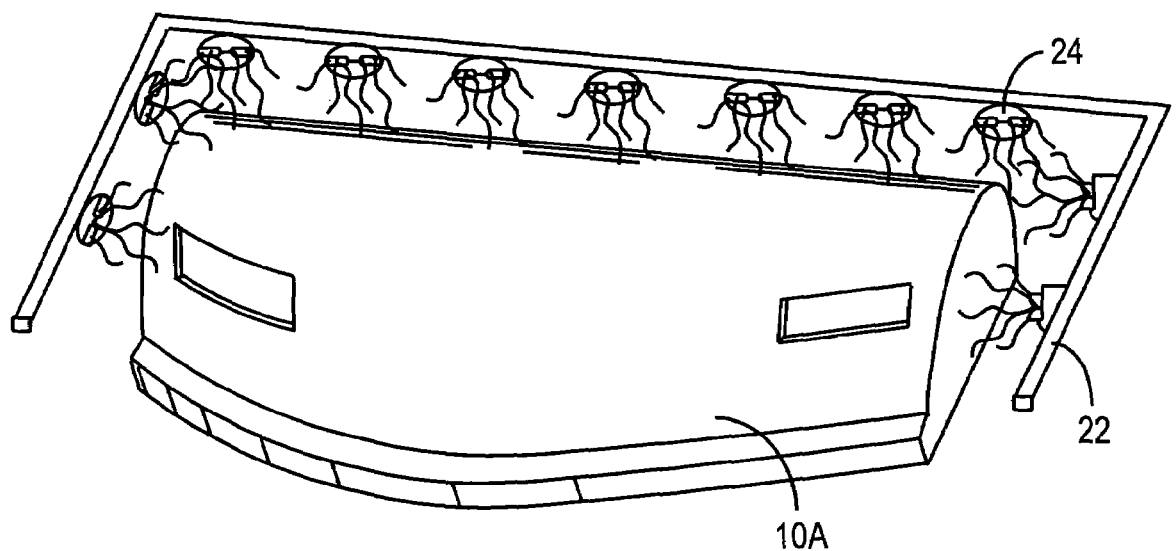
FIG. 4 is a sectional view of the contoured cooling apparatus of the present invention.

To provide a rapid cooling cycle, change of phase or change in state cooling, such as evaporative cooling, is preferably employed since it takes advantage of the latent heat absorbed by a change in phase of the cooling media. This reduces the problems previously encountered using ambient air for cooling, especially during seasonal extremes (summer heat). In order to minimize the messiness of deluging the mold with water, the hot electroformed mold containing the cast shell was sprayed using air at about 100 psi to atomize chilled water forced through spray nozzles (such as Binks or DeVilbis). As shown in FIG. 4, the spray nozzles were arranged in an adjustable pattern approximating the mold contour to ensure uniformity of cooling. These nozzles can be tuned using thermographic techniques as well to insure uniform cooling of the skin before stripping it from the mold. An air-over-water cooling system using an air surge tank to maintain a constant high volume high pressure supply was provided. FIG. 4 is a sectional view of the evaporative cooling apparatus. A frame 22 was constructed to follow the shape of the mold which allowed for rows of nozzles 24 to be installed along its length and width. The nozzles 24 are preferably set to be evenly spaced apart and a consistent distance from the mold 10, including its ends, to provide uniform and rapid cooling. Alternatively, the nozzles may be concentrated in an area of greater heat build-up, which may require additional cooling in order to optimize cycle time. By spraying a fine mist of micro-atomized air and water, the surface of the water will be exposed promoting evaporation and little puddling will result. A robot manipulates the mold from heating station (A) after preheating (see FIG. 2), to casting station (B), back to heating station (A) for fusing, and finally to cooling station (C). Having the spray nozzles for cooling in a separate station (C) from heating (A) allows for longer nozzle life without clogging. It is further possible to treat the cooling water for algae, bacteria and scale to maintain the condition of the spray nozzles and keep the surface of the mold clean. While not required, it is preferred to provide chilled water to cool the mold and provide for consistent cycle times regardless of the season.

Turning now to FIG. 2, the process sequence will be described. An electroformed nickel mold is placed under an IR heating unit in station A, described in FIG. 2 at position 1, in an inverted fashion where the backside of the mold has been painted black to optimize absorptivity. The IR heater elements which have been contoured to resemble the backside of the electroformed mold preferably direct infrared energy at the backside of the mold (see FIG. 3). A thermocouple is attached to the mold cavity surface. When the mold reaches the optimum casting temperature for the specific thermoplastic being cast (thermoplastic urethane, polyvinyl chloride, thermoplastic elastomer, thermoplastic olefin, acrylonitrile-styrene-acrylic, blends and alloys thereof and the like), the mold is moved to a casting station B, as shown in FIG. 2 at position 2, where it is clamped to a powder box containing the thermoplastic powder. As the powder box/mold combination is rotated around its major axis, powder contacts the hot mold surface and melts to form a uniform plastic layer. After rotation of 20 seconds or so, the mold is inverted so that any excess powder falls into the powder box, which is then separated from the mold, and retracted. The electroformed mold is next moved back to the IR heating station A, shown at position 3 in FIG. 2, to complete the fusing process (generally a mold temperature of about 400 degrees F. depending on the specific powder or liquid plastic being cast). The mold is next moved to a cooling station C, shown in FIG. 2 at position 4, where a mist of water and air is sprayed on either one or both of the front and back surfaces to cool the mold to a strip temperature of about 140-150 F. (roughly 30-60 seconds). Upon reaching the strip temperature, the plastic shell is removed from the mold at station D, shown in FIG. 2 at position 5, and a new cycle is initiated. In the instance where multiple layers of plastic (regrind, foamed, different colors, properties or compositions of materials) may be cast in layered or adjacent disposition, the mold, after preheating, may be connected sequentially to multiple powder boxes followed by multiple heating cycles to melt successive layered or non-layered plastic material on to the mold surface. Alternately, a fourth mold station (second casting station) may be added to the layout.

It has therefore been established that in the context of the present invention, a plurality of plastic materials may be cast in an accelerated processing environment. For example, the time for casting said first plastic material and said second plastic material is less than 3.0 minutes, as a consequence of the use of the IR heating elements Which provide the ability to rapidly alter mold temperature. Specifically, it has been found that one can preheat the mold in about 80 seconds (more generally 1-2 minutes), cast a first material in about 20 seconds (more generally 10-40 seconds), return the mold to the preheat station for heating to a second temperature for a second plastic material over a period of about 15 seconds (more generally 10-45 seconds), and casting said second plastic material, again, over a period of about 20 seconds (more generally 10-45 seconds).

While evaporative cooling is preferred here, any process using latent heat (that required to change phase or state) is acceptable, so that in addition to water, materials like liquid nitrogen, dry ice ($CO_2$), etc. and combinations thereof may find use. The spray nozzle pattern can be optimized by contouring the nozzle layout to resemble the mold contour and accommodate any variations in mold thickness.

Thus, it can be seen that the invention provides a new and improved method for producing thin plastic skins or shells from a liquid or powder casting process. By employing electric infrared heating, a simplified process requiring few molds, and much less ducting and conveying apparatus, and which emits significantly less noise and waste heat to the environment is achieved. In addition, a heat balancing method to provide uniform mold temperature, and more uniform shell thickness and gloss uniformity is disclosed using black body absorptivity. The process may find particular use in countries where electricity is cheaper than propane or oil as a source of process heating. Further, the use of latent heat of vaporization or sublimation is disclosed to provide significantly faster mold cooling cycles which contribute to faster total cycle times, reducing the number of molds and mold stations required to produce high volumes of shells. The process as described herein is not limited to the production of thin plastic articles for use in automotive applications, but may also find use in any field in industry where a thin plastic layer may be solidified onto a mold surface, including but not limited to toys, shoes, medical goods, etc.

The description and drawings illustratively set forth the presently preferred invention embodiments. The description and drawings are intended to describe these embodiments and not to limit the scope of the invention. Those skilled in the art will appreciate that still other modifications and variations of the present invention are possible in light of the above teaching while remaining within the scope of the following claims. Therefore, within the scope of the claims, one may practice the invention otherwise than as the description and drawings specifically show and describe.

What is claimed is:

1. A method of producing plastic articles, comprising:
preheating a metal mold having a backside having a contour and positioning infrared energy from a plurality of electric infrared energy heating elements in an array, wherein each element is bent in a pattern to conform to and is spaced from said contour and provides infrared energy at the backside of said mold to heat said mold, wherein said mold does not rotate relative to said heating element array;
casting a plurality of plastic materials onto said preheated metal mold;
fusing said plurality of plastic materials using infrared energy;
cooling said metal mold by contacting said metal mold with a material which can change state;
removing the cast plastic article from said metal mold, wherein said array comprising said plurality of conforming electric infrared energy heating elements is spaced 0.01-5.0 inches from the backside of said mold and said elements are further spaced about 1-3 inches apart running along the backside of said mold to provide relatively uniform coverage of said backside of said mold.

2. The method of claim 1 wherein said mold has a thickness between about 0.050 to 0.400 inches.

3. The method of claim 1 wherein said infrared energy is supplied from tubular elements.

4. The method of claim 1 wherein said infrared energy from said infrared heating elements provides a uniform temperature to said metal mold.

5. The method of claim 1 wherein said plastic article removed from said mold has a thickness of 0.025-0.040 inches.

6. The method of claim 1 wherein said infrared heating elements supply at least about 20 watts/square inch.

7. The method of claim 6 wherein said heaters operate in the temperature range of 400-2000° F.

8. The method of claim 7 wherein said heaters operate in the range of 1275-1750° F.

9. The method of claim 1, wherein said metal mold is coated with a paint to affect the absorption of said infrared energy.

10. The method of claim 9 wherein said paint is selectively applied to said mold to selectively locate said absorption of said infrared energy.

11. The method of claim 1 wherein said change of state employs latent heat.

12. The method of claim 11 wherein said change of state is evaporation.

13. The method of claim 11 wherein said change of state is sublimation.

14. The method of claim 1 wherein said cooling said metal mold by contacting said metal mold with a material which can change state comprises cooling by spraying said mold with a mist of air and water.

15. The method of claim 1 wherein cooling said metal mold by contacting said metal mold with a material which can change state comprises a combination of evaporation and sublimation.

16. The method of claim 1 wherein said plurality of plastic materials are selected from the group consisting of urethane, vinyl, olefin, acrylic, acrylonitrile, butadiene, styrene, thermoplastic elastomer, polysulfone, polyimide, polyphenylene oxide, polyamide, epoxy, and combinations thereof.

17. The method of claim 1 wherein said casting of said plurality of plastic materials onto said preheated metal mold surface comprises casting a plurality of plastic materials in layered or in adjacent disposition.

18. The method of claim 17 wherein said plurality of plastic materials include different polymer compositions, plastic materials having different colors, foamed plastic materials, and reground plastic materials.

19. A method of producing plastic articles, comprising a metal mold that is positioned at a first heating station, wherein a metal mold having a backside having a contour is preheated by positioning infrared energy from a plurality of electric infrared energy heating elements in an array wherein each element is bent in a pattern to conform to and is spaced from said contour and provides said infrared energy at the backside of said mold to heat said mold, wherein said mold does not rotate relative to said heating element array;

positioning said mold at a second station and casting a plurality of plastic materials onto said preheated metal mold;

positioning said mold at said first station and fusing said plurality of plastic materials using infrared energy from said array of infrared energy heating elements;

positioning said mold at a third station and cooling said metal mold by contacting said metal mold with a material which can change state;

positioning said mold at a fourth station and removing the cast plastic article from said metal mold, wherein said array comprising said plurality of conforming electric infrared energy heating elements is spaced 0.01-5.0 inches from the backside of said mold and said elements are further spaced about 1-3 inches apart running along the backside of said mold to provide relatively uniform coverage of said backside of said mold.

20. The method of claim 19 wherein said mold is positioned at said first, second, third and fourth stations using a robot.

21. The method of claim 19 wherein said casting of a plurality of plastic materials comprises casting a first plastic material followed by re-positioning said mold at said first heating station to preheat said mold followed by casting a second plastic material.

22. The method of claim 21 wherein the time for casting said first plastic material and said second plastic material is less than 3.0 minutes.

23. Apparatus for products cast as plastic articles comprising;
(i) a metal mold to receive a plurality of cast plastic materials, said mold having a backside having a contour;
(ii) a plurality of infrared heaters in an array to heat said mold to a desired casting temperature, said infrared heaters including electric infrared heating elements wherein each element is bent in a pattern to conform to and is spaced from said contour and provides heat at the backside of said mold, wherein said mold does not rotate relative to said heating element array;
(iii) a cooling device to deliver a material which can change state,
wherein said array comprising said plurality of conforming electric infrared energy heating elements is spaced 0.01-5.0 inches from the backside of said mold and said elements are further spaced about 1-3 inches apart running along the backside of said mold to provide relatively uniform coverage of said backside of said mold.

24. The apparatus of claim 23 wherein said infrared heaters comprise tubular elements.

25. The metal mold of claim 23 wherein said mold comprises a nickel electroform.

26. The cooling device of claim 23 wherein said cooling device comprises spray nozzles.

27. The apparatus of claim 23 including a robotic device wherein said apparatus includes stations for heating to a desired casting temperature, casting said plurality of plastic materials, and a station for cooling, wherein said mold is selectively positioned at said station for heating, casting and cooling by said robot.

* * * * *